Jan. 12, 1954  H. M. BUCKWALTER  2,665,734
PROTECTION OF CELLULOSE FIBER AGAINST HEAT AGING
AND TIRE CASING CONTAINING SUCH FIBER
Filed Feb. 27, 1951
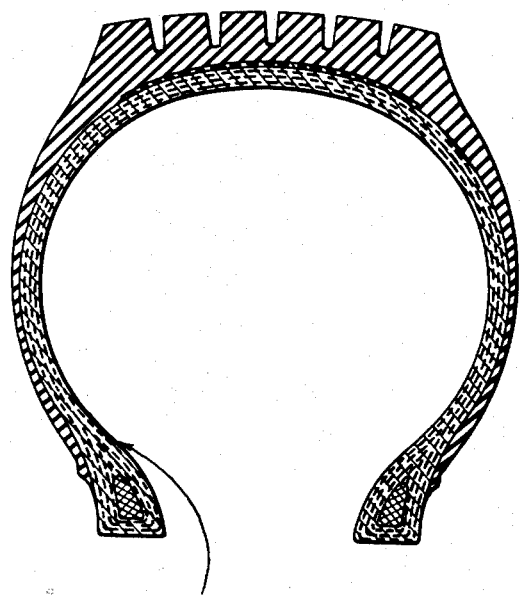
CELLULOSE TIRE CORDS CONTAINING
DICYANDIAMIDE AS SUCH
TO PREVENT HEAT DETERIORATION
INVENTOR.
HOWARD M. BUCKWALTER
BY James J. Long
AGENT Patented Jan. 12, 1954

2,665,734

UNITED STATES PATENT OFFICE 2,665,734

PROTECTION OF CELLULOSE FIBER AGAINST HEAT AGING AND TIRE CASING CONTAINING SUCH FIBER

Howard M. Buckwalter, Detroit, Mich., assignor to United States Rubber Company, New York, N. Y., a corporation of New Jersey Application February 27, 1951, Serial No. 213,040

7 Claims. (Cl. 152—359)

This invention relates to the protection of native and regenerated cellulose fibers against deterioration by heat aging. This application is a continuation-in-part of my application Serial No. 116,856, filed September 20, 1949, and now abandoned.

Deterioration of cellulose fiber upon subjection to elevated temperatures for prolonged periods of time is a very serious problem in the art. This problem is encountered particularly in the case of rubber articles which are reinforced with cellulose fiber, almost invariably stranded and in the form of cords or fabric, which may be a woven fabric having warp and woof threads or a so-called "weftless fabric" or "web fabric" composed of parallel cords joined together by a dry deposit of rubber latex, as described for example in the patent to Hopkinson, No. 1,424,020. Such cellulose fiber reinforced articles include pneumatic tires, steam hose, power transmission belts, conveyor belts, etc. These articles are subjected to elevated temperatures in normal use, either because they are subjected to external heating, or because they generate heat within themselves by reason of repeated rapid flexing, as in the case of pneumatic tires. The deterioration of the reinforcing cellulose fiber under the action of heat is particularly evidenced by progressive reduction in tensile strength of the fiber, leading to eventual breakage. This deteriorating action of prolonged heating on cellulose fibers is a principal cause of failure of such articles as pneumatic tires and steam hose.

The principal object of the present invention is to provide an improved method of protecting cellulose fiber, especially when stranded and in the form of a fabric, against deterioration by heat aging. Another object is to provide articles of manufacture embodying cellulose fibers protected against heat deterioration, such articles of manufacture including cellulose fibers themselves, whether unstranded, stranded, or in the form of fabric, and vulcanized rubber articles reinforced with such cellulose fibers, such as pneumatic tire casings reinforced therewith. Other objects of the invention will more fully hereinafter appear.

The single figure of the accompanying drawing is a transverse sectional view of a pneumatic tire reinforced with cellulosic tire cords treated in accordance with the invention. The structure of the tire is otherwise conventional.

According to the present invention, cellulose fiber is protected against deterioration by heat aging by incorporating dicyandiamide therein. I have found that dicyandiamide is a remarkably effective chemical in imparting to cellulose fibers the ability to withstand deterioration by the action of heat over extended periods of time.

In carrying out the invention, the dicyandiamide may be applied to the cellulose fiber in any suitable manner, conveniently by immersing the fiber to be treated in a solution of the dicyandiamide for a time sufficient for the fiber to become substantially impregnated with the dicyandiamide solution. Another method of incorporating the dicyandiamide in the cellulose fiber is to form the dicyandiamide "in situ" within the fiber, that is, the fiber may be first treated at room temperatures with cyanamide solution (pH 6-10) in any suitable manner, and subsequently subjected to conditions which will cause the cyanamide to be dimerized to dicyandiamide, e. g., slow dimerization on prolonged standing at room temperature, or more rapid dimerization during drying of the fabric at elevated temperatures (150°–200° F.) or during curing (250°–290° F.) when the product is incorporated in rubber.

The cellulose fiber employed is usually ordinary grey cotton fiber although the process of the invention may also be employed advantageously with the various regenerated cellulose fibers, such as viscose rayon. The invention is applicable to native cellulose fibers in general, such as flax, hemp, etc., as well as to scoured, bleached and mercerized cotton. In place of immersing the fiber in the treating solution, I may incorporate the dicyandiamide or cyanamide in the fiber in any other suitable manner, such as by spraying or brushing.

For convenience, I usually employ the dicyandiamide in the form of an aqueous solution, typically at a concentration of 10% by weight, although marked improvement in heat age resistance is also obtainable with surprisingly dilute solutions, e. g., solutions containing 0.2% dicyandiamide. If desired, more concentrated solutions may be employed, e. g., a 20% solution, or even a saturated solution (46% at 100° C.), although there is ordinarily only minor advantage in using solutions more concentrated than about 25%. Cyanamide in solution may be used in place of dicyandiamide, provided the temperature does not exceed average room temperatures to avoid as far as possible spontaneous polymerization, and later dimerized.

The treatment with dicyandiamide may be carried out at room temperature, or at elevated temperatures, for example, up to the boiling point of the aqueous solution. The time of contact between the cellulose fiber and the treating solution should be sufficient to permit substantial penetration of the fiber. Usually treatment times of from 15 seconds to 10 minutes at the boiling point are adequate for this purpose, although longer treatment times are without adverse effect and may be employed if desired.

In order to obtain the benefits of the treatment of this invention it is necessary that the dicyandiamide remain in the cellulose fiber and be actually present as such in the fiber at the time the fiber is subjected to the heating which would ordinarily cause deterioration. I have found that dicyandiamide present in the cellulose fiber in amount from 0.1 to 10.0% on the weight of the fiber is effective to produce substantial improvement in the heat age resistance of the fiber.

The following examples will illustrate the practice of my invention in more detail.

EXAMPLE 1

Grey cotton tire cord was immersed in a boiling (100.5° C. at 760 mm.) 10% by weight aqueous solution of dicyandiamide for 2 minutes. The cord was then removed from the solution, and the excess solution was allowed to drain off the cord. The cord was then dried at 110° C. The cord was thereafter aged in the air at a temperature at 165° C. for 72 hours. This procedure is known as open heat aging. The 165° C. aging temperature is considerably in excess of the temperature at which cotton cord ordinarily suffers serious progressive irreversible loss of tensile strength due to chemical deterioration of the cotton by the action of the heat, namely 125° C. After such aging the tensile strength of the treated cotton cord was determined at 70° F. and 60% relative humidity, and the results obtained were compared to control samples as follows:

| Sample | Tensile strength, lbs. | Percent of original strength remaining | Relative strength |
|---|---|---|---|
| Control; untreated, unaged | 16.6 | 100 | |
| Control; untreated, aged | 6.4 | 39 | 100 |
| Dicyandiamide treated, aged | 13.2 | 80 | 206 |

The foregoing data shows that while the untreated cotton cord retained only 39% of its original strength after the open heat aging, the dicyandiamide treated cord retained 80% of its original strength. The dicyandiamide treated cord was more than two times as strong as the untreated cord after subjecting to the heat deterioration conditions.

EXAMPLE 2

Grey cotton tire cord and viscose rayon tire cord were treated with aqueous dicyandiamide solutions of varying concentration for two minutes at the boiling point of the solution in the same manner as in Example 1. The cords were similarly drained, dried, and subjected to open heat aging conditions, and tested for tensile strength in the manner previously indicated. The results are shown in Table I.

Table I

OPEN HEAT AGING OF COTTON AND RAYON CORD

| Weight percent dicyandiamide in treating solution | Hours open, heat aging at 165° C. | Cotton | | | Rayon | | |
|---|---|---|---|---|---|---|---|
| | | Tensile strength, lbs. | Percent of original strength retained | Relative strength | Tensile strength, lbs. | Percent of original strength retained | Relative strength |
| 0 | 0 | 16.6 | 100 | | 21.0 | 100 | |
| 0 | 72 | 6.4 | 39 | 100 | 8.5 | 40 | 100 |
| 0.25 | 72 | 11.1 | 67 | 173 | 9.1 | 43 | 107 |
| 0.50 | 72 | 11.0 | 66 | 172 | 9.0 | 43 | 106 |
| 1.0 | 72 | 11.7 | 70 | 183 | 9.2 | 44 | 108 |
| 2.0 | 72 | 11.3 | 68 | 176 | 9.3 | 44 | 109 |
| 5.0 | 72 | 13.0 | 79 | 203 | 9.3 | 44 | 109 |
| 10.0 | 72 | 14.5 | 87 | 226 | 10.3 | 49 | 121 |
| 15.0 | 72 | 14.9 | 90 | 232 | 11.0 | 52 | 129 |
| 20.0 | 72 | 15.2 | 91 | 237 | 11.6 | 55 | 136 |

The data in Table I indicate that dicyandiamide at all concentrations has a much greater heat stabilizing effect on grey cotton than it has on rayon. For example, a 20% solution of dicyandiamide increased the 72 hour —165° C. age strength of cotton 137%, whereas rayon, under comparable conditions, is improved only 36%.

EXAMPLE 3

Grey cotton tire cord was treated with aqueous dicyandiamide of various concentrations in the same manner as in the foregoing examples. The treated cord was conditioned 24 hours at 70° F., 60% relative humidity and then sealed in a tube and subjected to heat aging for 72 hours at 165° C., following which the tube was broken and the aged cord was tensile tested at 70° F. and 60% relative humidity. The data obtained are tabulated in Table II.

Table II

SEALED TUBE AGING OF COTTON CORD

| Weight percent Dicyandiamide in treating solution | Hrs. aged in sealed tube at 165° C. | Tensile strength, Lbs. | Percent of original strength retained |
|---|---|---|---|
| 0 | 0 | 16.6 | 100 |
| 0 | 72 | 0 | 0 |
| 2 | 72 | 7.1 | 48 |
| 4 | 72 | 8.9 | 54 |
| 6 | 72 | 11.1 | 67 |
| 10 | 72 | 12.1 | 73 |
| 15 | 72 | 14.1 | 85 |

These data indicate that dicyandiamide also affords excellent protection against pyrolysis, or heat deterioration, under sealed aging conditions. Such sealed heat aging tests are found to correlate closely with the behavior of the cellulose fiber under service conditions wherein the fiber is substantially isolated from the influence of the ambient atmosphere, such as in pneumatic tires, where the fibers are encased in layers of substantially impervious rubber.

I have also found that it is advantageous to combine the dicyandiamide treatment of the present invention with the treatment of cotton fibers with sodium rosinate-silicate and the like, as described in my U. S. Patent 2,297,536 issued September 29, 1942. The sodium rosinate-silicate treatment protects the grey cotton against the temporary reversible loss of tensile strength which normally occurs substantially instantaneously upon heating the cotton to elevated temperature, while the dicyandiamide protects against the progressive, irreversible loss of strength which occurs upon extended exposure to heat. In this form of the invention the two treatments can be carried out simultaneously by adding the dicyandiamide to the sodium rosinate-silicate solution, or the treatments may be carried out successively in any desired order. If desired, the treated cord may be stretched, or stretched and shrunk, to effect further increase in tensile strength. The following example illustrates a combined treatment with dicyandiamide and sodium rosinate-silicate.

EXAMPLE 4

Varying amounts of dicyandiamide were added to a 10% by weight aqueous solution of sodium rosinate, technical grade, and grey cotton tire cords were treated with the composite solution in the manner indicated in the previous examples. After open heat aging, the cotton cords were tensile tested at 70° F. and 60% relative humidity with the results shown in Table III.

Table III
COMBINED TREATMENT OF COTTON WITH DICYANDIAMIDE AND SODIUM ROSINATE

| Weight percent aqueous sodium-resinate solution | Weight percent dicyandiamide added to sodium-rosinate solution | Hrs. open, aging at 165° C. | Tensile strength, Lbs. | Percent of original strength retained | Relative strength |
|---|---|---|---|---|---|
| 0 | 0 | 0 | 16.6 | 100 | |
| 0 | 0 | 72 | 6.9 | 41 | 100 |
| 10 | 0 | 0 | 20.4 | 123 | |
| 10 | 0 | 72 | 8.0 | 48 | 116 |
| 10 | 2 | 0 | 20.5 | 124 | |
| 10 | 2 | 72 | 9.3 | 56 | 135 |
| 10 | 5 | 0 | 19.8 | 119 | |
| 10 | 5 | 72 | 11.5 | 69 | 167 |
| 10 | 10 | 0 | 21.3 | 128 | |
| 10 | 10 | 72 | 14.4 | 87 | 209 |
| 10 | 20 | 0 | 20.9 | 126 | |
| 10 | 20 | 72 | 15.7 | 95 | 227 |

The data of Table III indicate that dicyandiamide also produces substantial improvement in resistance to heat aging in cotton cord treated with sodium rosinate solution.

EXAMPLE 5

This example illustrates formation of dicyandiamide "in situ" in tire cord by treating the cord with a composition of cyanamide. The example also illustrates combination of the treatment according to the invention with a rubber latex impregnating step, which is a conventional step in preparing pneumatic tire fabric for incorporation in the tire carcass.

Rayon tire cord was impregnated with rubber latex containing varying concentrations of cyanamide, as indicated in Table IV below. The cord was treated by immersing it for three seconds at room temperature in a latex-resin composition containing, in addition, to cyanamide in amounts shown, GR-S or natural rubber latex compounded with the conventional curatives and modifiers, e. g., sulfur, zinc oxide, accelerator and resorcinol resin. The treated cord was dried for 15 minutes at 220° F. It is believed that the cyanamide began to dimerize to some extent in the latex bath, and that the heat of the drying operation brought the dimerization substantially to completion.

The cord fabric was then skim coated with vulcanizable rubber tire carcass stock in the usual manner, and fabricated into 4.00-8 size 6 ply pneumatic tires which were vulcanized by the usual factory methods. The tires were mounted on test wheels and inflated, and subjected to a temperature of 392° F. for 72 hours to test the ability of the cords to resist high-temperature degradation. After this aging period, the cords were removed from the tires and the tensile strength of the cords was measured at 70° F. and 60% relative humidity, with the results noted in Table IV.

Table IV

| Concentration of cyanamide (parts by weight in 100 parts of latex) | Hours aged at 392° F. | Tensile strength of cord | |
|---|---|---|---|
| | | Lbs. | Relative strength |
| None | 0 | 21.0 | |
| None | 72 | 6.3 | 100 |
| 0.5 | 72 | 12.0 | 191 |
| 1.0 | 72 | 14.5 | 230 |
| 2.0 | 72 | 14.9 | 236 |
| 3.0 | 72 | 16.4 | 260 |
| 4.3 | 72 | 16.6 | 263 |

Inspection of the foregoing data will reveal that the cyanamide treatment imparted to the tire cords an improved ability to withstand within the tire the deteriorating effects of prolonged exposure to elevated temperatures.

EXAMPLE 6

The foregoing Example 5 was repeated, except that dicyandiamide was used in the latex composition in place of cyanamide. Tires made with the treated cord were aged on a test wheel as before, with the results shown in Table V:

Table V

| Concentration of dicyandiamide in latex (parts by weight per 100 parts of latex) | Tire aged at 165° C., hours | Tensile strength of cord | |
|---|---|---|---|
| | | Lbs. | Relative strength |
| 0.0 | 0 | 21.0 | |
| 0.0 | 72 | 6.1 | 100 |
| 0.5 | 72 | 9.5 | 156 |
| 1.0 | 72 | 12.0 | 196 |
| 2.0 | 72 | 15.5 | 254 |
| 3.0 | 72 | 16.0 | 262 |
| 4.0 | 72 | 16.2 | 266 |
| 6.0 | 72 | 15.9 | 261 |
| 7.0 | 72 | 15.8 | 258 |

It is evident from the data of Table V that the cord containing dicyandiamide withstood heat deterioration in the tire to a marked degree.

From the foregoing it is evident that the invention provides a method of treating cellulose fibers, whether grey cotton fibers or other forms of cellulose fiber such as regenerated cellulose, whether in the form of fibers as such, or as yarn, cord or fabric, whereby the resistance of the fiber to the deteriorating effect of prolonged exposure to elevated temperature is substantially enhanced. Thus, the improved cellulose fibers of this invention containing dicyandiamide are capable of improved serviceability especially when employed for such purposes as reinforcing tires, steam hose, and similar rubber-composite articles which normally have a limited service life because of the deteriorating action of heat on the fiber reinforcement therein.

The dicyandiamide treated fiber can be encased in rubber which may be subsequently vulcanized at elevated temperatures to a dense, strong product without any adverse effects due to the presence of the dicyandiamide. This is in contrast to certain other chemicals previously proposed for improving the heat age resistance of rayon cords and the like, but which are impractical because they decompose at vulcanizing temperatures with liberation of gases, causing blowing in the carcass assembly. Because the dicyandiamide is comparatively stable at vulcanizing temperatures it retains its chemical identity and remains in the fiber, and is available for protecting the fiber on subsequent exposure of the vulcanized articles to high temperature conditions over extended periods of service.

The dicyandiamide is not decomposed or removed by temperatures ordinarily employed in drying or baking tire cord after the cord, usually in the form of a web fabric, has been treated with rubber latex compositions.

As indicated previously, the dicyandiamide must actually remain as such in the cellulose fiber and be present while the fiber is exposed to elevated temperature service conditions in order to obtain the beneficial effects of the treatment. In this respect, my treatment differs from certain conventional treatments, particularly treatments designed to obviate the temporary, reversible loss of strength observed in grey cotton fibers when heated at elevated temperatures. Such temporary loss of tensile strength occurs substantially instantaneously upon heating to elevated temperature, and the cotton regains its original strength upon cooling to room temperature. Such temporary reversible loss of tensile strength at elevated temperature is obviated in the prior art methods referred to by removing the waxes from the native cotton, and such treatments are characterized by the fact that it is immaterial whether the treating agent is eventually removed from the cotton or whether the treating agent remains in the cotton. In contrast to this, the present invention is concerned with the irreversible chemical changes which occur in cellulosic fibers, whether grey cotton containing natural waxes, or dewaxed cotton, or regenerated cellulose, induced by elevated temperatures, e. g., 125° C. and higher. The desired protection against this form of deterioration is obtained only if the dicyandiamide is preserved as such in the treated fiber, preferably in amount of 0.1 to 10.0% on the weight of the fiber, and therefore it is undesirable to wash or extract the treated cords with solvents in a manner which would substantially remove the dicyandiamide or to treat the cords with any chemical reagent which would react with the dicyandiamide so as to change its chemical identity and make it ineffective for its purpose.

The foregoing considerations also apply when the dicyandiamide is prepared "in situ," that is when cyanamide is applied to the fiber and later converted to dicyandiamide. The cyanamide must not be washed out, or changed in chemical identity before it is dimerized to dicyandiamide.

While I have described my invention with particular reference to a preferred treatment of cellulose fibers intended to be used for reinforcing rubber articles, it will be understood that the improved dicyandiamide containing cellulose fibers of this invention are susceptible of many other uses where resistance to heat is a desirable characteristic. However, the improved cellulose fibers of the invention are especially adapted to production of vulcanized rubber-fabric composite articles, because the dicyandiamide or cyanamide have no deleterious effect on the vulcanization, and the dicyandiamide resists vulcanizing temperatures, thereby resulting in improved vulcanized rubber-fabric composite articles.

It will be understood that the references herein to preservation of the fibers from heat deterioration are not intended to indicate that the treated fibers are flame resistant or fireproof, and therefore no claim is made that the invention is capable of preventing rapid oxidation and consequent deterioration of the cellulose when it is exposed to temperatures above its ignition temperature.

Having thus described my invention what I claim and desire to protect by Letters Patent is:

1. The method of improving the resistance of cellulose fibers to the deteriorating effects of heat aging which comprises incorporating dicyandiamide in the cellulose fiber in amount of from 0.1 to 10.0% by weight and preserving the dicyandiamide as such in the fibers whereby the said dicyandiamide preserved in the fibers is available as such during subsequent exposure of the thus treated fibers to heat aging and the fibers are thereby substantially preserved against permanent irreversible loss of their original strength level after prolonged exposure to temperatures above 125° C. but below the ignition temperature of the fibers.

2. The method of improving the resistance of cellulose fibers to the deteriorating effects of heat aging which comprises impregnating the fibers with an aqueous solution containing from 0.2% to 25% by weight of dicyandiamide and preserving the dicyandiamide as such in the fibers whereby the said dicyandiamide preserved in the fibers is available as such during subsequent exposure of the thus treated fibers to heat aging and the fibers are thereby substantially preserved against permanent, irreversible loss of their original strength level after prolonged exposure to temperatures above 125° C. but below the ignition temperature of the fibers.

3. The method of improving the resistance of regenerated cellulose fibers to the deteriorating effect of heat aging which comprises impregnating the regenerated cellulose fibers with an aqueous solution containing from 0.2 to 25% by weight of dicyandiamide and preserving the dicyandiamide as such in the fibers whereby the said dicyandiamide preserved in the fibers is available as such during subsequent exposure of the thus treated fibers to heat aging and the fibers are thereby substantially preserved against permanent, irreversible loss of their original strength level after prolonged exposure to temperatures above 125° C. but below the ignition temperature of the fibers.

4. The method of improving the resistance of cellulose fibers to the deteriorating effects of heat aging which comprises incorporating cyanamide in the cellulose fiber in amount of from 0.1 to 10.0% by weight, subjecting the cyanamide to a temperature sufficiently elevated to convert it to dicyandiamide and preserving the dicyandiamide as such in the fibers whereby the said dicyandiamide is available as such during subsequent exposure of the thus treated fibers to heat aging and the fibers are thereby substantially preserved against permanent, irreversible loss of their original strength level after exposure to temperatures above 125° C. but below the ignition temperature of the fibers.

5. A vulcanized rubber article reinforced with cellulose fibers containing from 0.1% to 10.0% by weight of dicyandiamide as such.

6. A pneumatic tire casing reinforced with cellulose tire cords containing from 0.1% to 10.0% by weight of dicyandiamide as such.

7. A pneumatic tire casing reinforced with regenerated cellulose tire cords containing from 0.1% to 10.0% by weight of dicyandiamide as such.

HOWARD M. BUCKWALTER.

References Cited in the file of this patent

UNITED STATES PATENTS

| Number | Name | Date |
|---|---|---|
| 2,263,305 | Lessig et al. | Nov. 18, 1941 |
| 2,278,284 | Reese | Mar. 31, 1942 |
| 2,380,157 | Dreyfus | July 10, 1945 |
| 2,521,446 | Buckwalter et al. | Sept. 5, 1950 |
| 2,524,783 | Ford et al. | Oct. 10, 1950 |
| 2,539,558 | Studeny et al. | Jan. 30, 1951 |

FOREIGN PATENTS

| Number | Country | Date |
|---|---|---|
| 432,927 | Italy | Mar. 30, 1948 |

OTHER REFERENCES

"American Dyestuff Reporter" of January 12, 1948, pages 10–15.